United States Patent [19]
Hersee et al.

[11] Patent Number: 5,715,069
[45] Date of Patent: Feb. 3, 1998

[54] DATA ENCODING SYSTEM FOR RASTERIZED FONTS

[75] Inventors: Stephen A. Hersee, Wheaton, Ill.; Timothy O. Frost, Marlborough, England

[73] Assignee: Copia International, Ltd., Wheaton, Ill.

[21] Appl. No.: 337,551

[22] Filed: Nov. 10, 1994

[51] Int. Cl.$^6$ ................................. H04N 1/32
[52] U.S. Cl. ................. 358/438; 358/440; 358/462; 395/147
[58] Field of Search ................. 358/434–436, 358/440, 444, 400, 402–405, 426, 438, 439, 462; 380/18; 379/100; 395/147; H04N 1/44, 1/32

[56] References Cited

U.S. PATENT DOCUMENTS

| | | | |
|---|---|---|---|
| 4,013,827 | 3/1977 | Starck et al. | |
| 4,920,560 | 4/1990 | Kageyama | 379/100 |
| 5,001,572 | 3/1991 | Hashimoto et al. | 358/440 |
| 5,041,918 | 8/1991 | Ishida et al. | 358/450 |
| 5,115,326 | 5/1992 | Burgess et al. | 358/440 |
| 5,133,026 | 7/1992 | Fujiwara et al. | |
| 5,157,519 | 10/1992 | Jacobs | 358/470 |
| 5,230,628 | 7/1993 | Kaneko et al. | 358/400 |
| 5,241,595 | 8/1993 | Kuno | |
| 5,293,253 | 3/1994 | Kida et al. | 358/440 |
| 5,301,035 | 4/1994 | Hayafune | 358/438 |
| 5,386,297 | 1/1995 | Tanaka et al. | 358/438 |
| 5,452,099 | 9/1995 | Von Meister | 358/434 |
| 5,465,326 | 11/1995 | Sawada | 358/450 |

*Primary Examiner*—Kim Vu
*Attorney, Agent, or Firm*—Marshall, O'Toole, Gerstein, Murray & Borun

[57] ABSTRACT

A data encoding system having means for generating decodable data representing a facsimile number to which a document containing an image is to be sent via facsimile, a rasterizer for rasterizing the image of the document and the decodable data to generate raster data, a decoder for decoding the data after the decodable data is rasterized by the rasterizer to determine the facsimile number to which the document is to be sent, and facsimile means for sending the raster data to the facsimile number determined by the decoder. The decoder comprises a permanent memory having stored coding data which includes character data representing a plurality of characters and a unique binary code associated with each of the characters. The decodable data generator comprises a permanent memory having font data stored therein for representing each of a plurality of characters. The font data comprises, for each of the characters, a first data portion representing a human-readable representation of the character and a second data portion representing a decodable representation of the character.

23 Claims, 8 Drawing Sheets

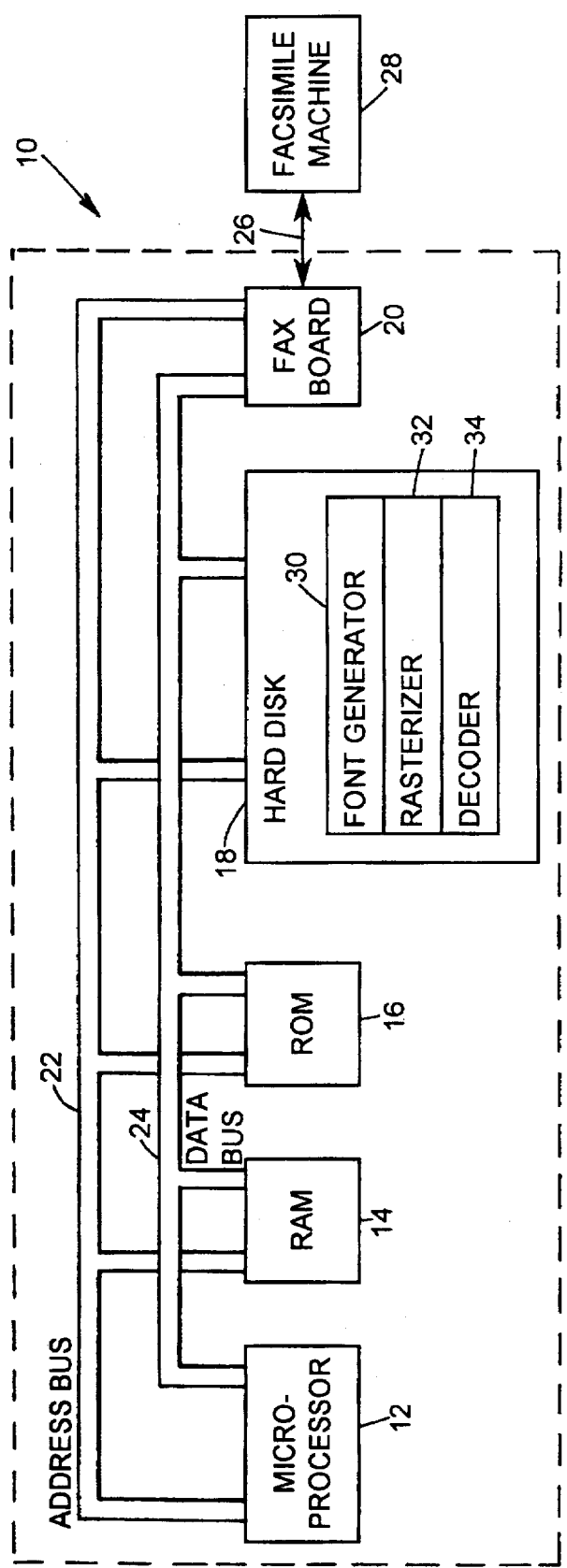
FIG. 1
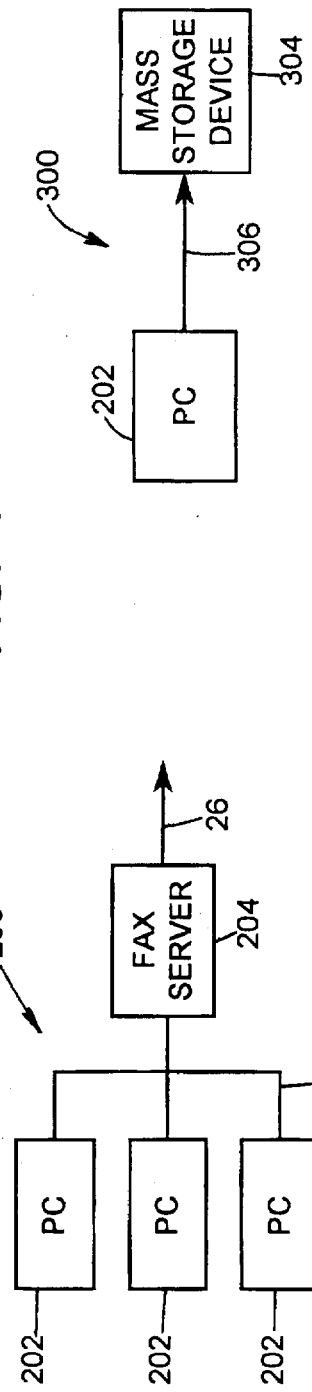
FIG. 3
FIG. 2

DATA ENCODING SYSTEM FOR RASTERIZED FONTS

BACKGROUND OF THE INVENTION

The present invention is directed to a data encoding system for generating data that can be decoded after it is rasterized by a rasterizer.

In a conventional personal computer which utilizes the Windows® graphical operating system marketed by Microsoft, a document may be sent via facsimile by the user in the following manner. First, the user creates the document, which in the Windows® system is a high-resolution, rasterized version of the document, to be faxed. When the document is ready to be faxed, the user requests, via the Windows® system, that the document be "printed" and selects the printer to be a facsimile "printer" which, depending on the configuration of the system, will cause a rasterized version of the document to be faxed either to a facsimile board resident in the personal computer or to a facsimile server outside the personal computer. When the facsimile board or facsimile server receives the rasterized version of the document, it requests the user to enter the facsimile number to which the document should be sent. The user must manually enter the facsimile number by typing it in via the personal computer keyboard.

The need for the user to type in the facsimile number results from the inability of the facsimile board or facsimile server to "recognize" the letters and numerals represented by the rasterized data. Thus, even though the facsimile number may be represented on the document to be faxed in rasterized format, the facsimile board or facsimile server does not have sufficient intelligence to recognize the facsimile number. A primary disadvantage of such a conventional system is that the user is required to manually enter the facsimile number after the document is sent to be faxed. Also, since there is typically a delay between the time the user sends the document to the facsimile board or facsimile server and the time the user is requested for the facsimile number, the user is typically interrupted by the request.

The requirement that the user manually type in the facsimile number may become a severe disadvantage when the user desires to fax the same document to multiple recipients using the conventional mail-merge feature of a personal computer. In general, the mail-merge feature allows a user to create a basic document and to create a customized version of the basic document for each of a plurality of recipients. For example, a basic document such as a letter is typically customized by the mail-merge feature by inserting the name and address of the intended recipient.

If the mail-merge feature is used for a document to be faxed to 100 different people, the mail-merge feature might create 100 different versions of the document. However, to fax each version to a different recipient, the facsimile board or facsimile server may repeatedly request that the user manually enter the facsimile number just prior to each document being faxed. When 100 versions of the document are to be faxed, the user is likely to be occupied for an hour or more manually typing in all the facsimile numbers as the documents are being transmitted.

SUMMARY OF THE INVENTION

In one aspect, the invention is directed to an apparatus which facilitates the simple and efficient transmission of documents via facsimile. The apparatus in accordance with this aspect of the invention includes means for generating decodable data representing a facsimile number to which a document containing an image is to be sent via facsimile and rasterizing means for rasterizing both the image of the document and the decodable data to generate raster data. The apparatus includes decoding means for decoding the decodable data after it is rasterized to determine the facsimile number to which the document is to be sent and facsimile means for sending the raster data to the facsimile number determined by the decoding means.

The ability of the decoding means to determine the facsimile number from the decodable data and transmit the facsimile number to the facsimile means avoids the need to have the user of the system manually type in the facsimile number prior to each document being faxed by the facsimile means.

The decoding means may comprise a permanent memory having stored coding data including character data representing a plurality of numeric characters and a unique binary code associated with each of the numeric characters. The decodable data-generating means may comprise a permanent memory having font data stored therein for representing each of a plurality of characters. The font data may comprise, for each of the characters, a first data portion representing a human-readable representation of the character and a second data portion representing a decodable representation of the character. The font generation means may additionally comprise means for causing, for each of the characters, the human-readable representation of the character to be disposed directly adjacent the decodable representation of the character when the character is placed in human-readable form.

In another aspect, the invention is directed to an apparatus which facilitates the simple and efficient transmission of rasterized data and keyword data associated therewith. The apparatus in accordance with this aspect of the invention includes a mass data-storage device, means for generating decodable data representing a keyword and keyword data associated with a document having an image to be transmitted to the mass storage device, and rasterizing means for rasterizing the document and the decodable data to generate raster data. The apparatus also includes decoding means for decoding the decodable data after it is rasterized to determine the keyword and the keyword data associated with the document and means for sending the raster data to the mass storage device.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is a block diagram of a first embodiment of the invention;

FIG. 2 is a block diagram of a second embodiment of the invention;

FIG. 3 is a block diagram of a third embodiment of the invention;

DETAILED DESCRIPTION OF A PREFERRED EMBODIMENT

Figure 4A:
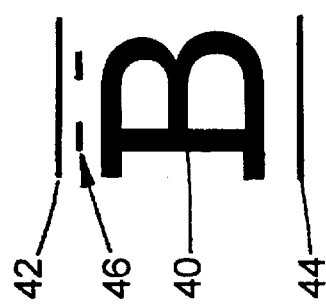
FIGS. 4A and 4B illustrate a font generated by the font generator shown in FIG. 1.

A block diagram of one embodiment of a data encoding system 10 in accordance with the invention is illustrated in FIG. 1. Referring to FIG. 1, the data encoding system 10 includes a microprocessor 12, a random-access memory (RAM) 14, a read-only memory (ROM) 16, a permanent memory in the form of a hard disk memory 18, and a facsimile board 20, all of which are interconnected by an address bus 22 and a data bus 24. As used herein, the term "permanent memory" includes, but is not limited to, hard disks, floppy disks, ROMs, EEPROMs, and other types of devices used for nonvolatile storage of data. The microprocessor 12, the RAM 14, the ROM 16, and the facsimile board 20 are conventional components which are commonly incorporated in commercially available personal computers. The facsimile board 20 is connected via a telephone line 26 to a receiver facsimile machine 28 disposed at a location remote from the location of the system 10. As used herein, the term "receiver facsimile machine" means a facsimile apparatus (such as a facsimile board or facsimile server) that receives data in rasterized form.

The hard disk memory 18 includes a font generator 30, a rasterizer 32, and a decoder 34. The rasterizer 32 may be a conventional and commercially available computer program, such as the universal print driver of the Windows® operating system marketed by Microsoft, which converts ASCII-encoded data into raster data. As is well known, each character of data encoded in standard ASCII format has a corresponding, unique 7-bit binary code associated therewith. As used herein, the term "raster data" refers to binary data that represents an image on a document which is logically subdivided into very small (x, y) locations or pixels, each (x, y) location being assigned a binary "1" if there is a portion of the image present at that location or a binary "0" if that location is blank. As used herein, the term "rasterizer" means a computer program routine or device that converts non-raster data into raster data.

The font generator 30 allows a user of the system 10 to place characters, such as letters and numerals, in a special font that is decodable by the decoder 34. One character that has been placed in the special font is illustrated in FIG. 4A. Referring to FIG. 4A, each character that is placed or encoded in the special font has a human-readable representation 40 of the character, which in this case is the letter "B," an upper registration bar 42, a lower registration bar 44, and a coded portion 46 containing a 6-bit binary code which uniquely represents the letter "B" and which is disposed directly adjacent the representation 40 of the character.

Figure 4B:
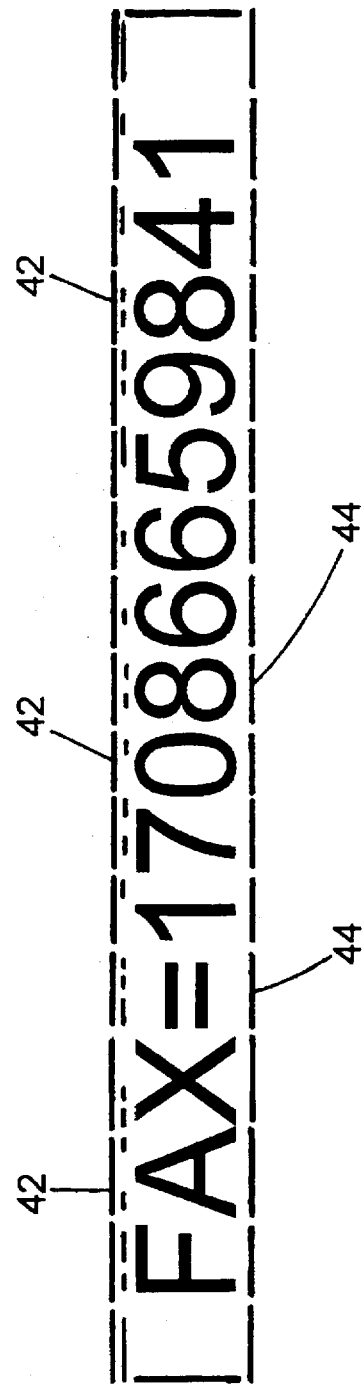

In the preferred embodiment, each of the registration bars 42, 44 is 18 pixels wide. As shown in FIG. 4B, when a plurality of font characters such as that shown in FIG. 4A are utilized, there is a two-pixel blank space between each of the adjacent upper and lower registration bars 42, 44 (thus resembling a pair of dotted lines between which the human-readable portions 40 of the characters are disposed). Consequently, when the blank pixels are included, each of the registration bars 42, 44 has an 1/18/1 pixel pattern.

The coded portion 46, which is the same pixel length as the registration bars 42, 44, has a pixel pattern of 1/3/3/3/3/3/3/1, which represents an initial single blank pixel, six codable three-pixel segments, and a final blank pixel. In the coded portion 46, the three pixels in each of the six codable segments are either all black (represented by a binary "1") or all blank (represented by a binary "0"). Thus the 6-bit binary code for the letter "B" shown in FIG. 4A is (the two ones represent the location of the two black three-pixel segments shown in the coded portion 46). The six-bit binary codes which uniquely represent the alphanumeric characters usable in the preferred embodiment are shown in the table set forth below. Other coding schemes could be used.

| Character | Code |
|---|---|
| unused | 000000 |
| space | 000001 |
| 0 | 000010 |
| 1 | 000011 |
| 2 | 000100 |
| 3 | 000101 |
| 4 | 000110 |
| 5 | 000111 |
| 6 | 001000 |
| 7 | 001001 |
| 8 | 001010 |
| 9 | 001011 |
| ( | 001100 |
| ) | 001101 |
| + | 001110 |
| − | 001111 |
| / | 010000 |
| A | 010001 |
| B | 010010 |
| C | 010011 |
| D | 010100 |
| E | 010101 |
| F | 010110 |
| G | 010111 |
| H | 011000 |
| I | 011001 |
| J | 011010 |
| P | 100000 |
| Q | 100001 |
| R | 100010 |
| S | 100011 |
| T | 100100 |
| U | 100101 |
| V | 100110 |
| W | 100111 |
| X | 101000 |
| Y | 101001 |
| Z | 101010 |
| # | 101011 |
| $ | 101100 |
| % | 101101 |
| & | 101110 |
| * | 101111 |
| ' | 110000 |
| . | 110001 |
| : | 110010 |
| ; | 110011 |
| < | 110100 |
| = | 110101 |
| > | 110110 |
| ? | 110111 |
| @ | 111000 |
| \ | 111001 |
| — | 111010 |
| K | 011011 |
| L | 011100 |
| M | 011101 |
| N | 011110 |
| O | 011111 |
| ! | 111011 |
| unused | 111100 |
| unused | 111101 |
| { or [ | 111110 |
| } or ] | 111111 |

In the preferred embodiment, the system 10 does not make any distinction between lower and upper case letters.

The operation of the system 10 when used for sending documents via facsimile is described below. After a user of the system 10 generates a document (such as by a word processing program which is typically used in connection with the system 10), the user includes on the top line of the document a keyword, such as "FAX=," to indicate to the system 10 that the keyword data following the keyword will be the facsimile number to which the document is to be sent. Thus, the top line of the document might contain the character string in the special font described above: "FAX= 17086659841"(see FIG. 4B). As used herein, the term "facsimile number" means the number required to send a document via facsimile over a telephone line from the system 10 to a receiver facsimile machine at a location remote from the system 10. For the United States, the facsimile number would be a 7-digit number (for local calls).

After the character string is included in the top line of the document and the user requests that the system 10 send the document via facsimile, the document, including the character string in the special font, is in rasterized form. As used herein, the term "document" includes but is not limited to documents represented in electronic form such as in ASCII form and rasterized form. Before the rasterized document is sent via facsimile, the decoder routine 34 is performed so that the decoder 34 can automatically "inform" the facsimile board 20 of the facsimile number to which the document should be transmitted.

Figure 5:
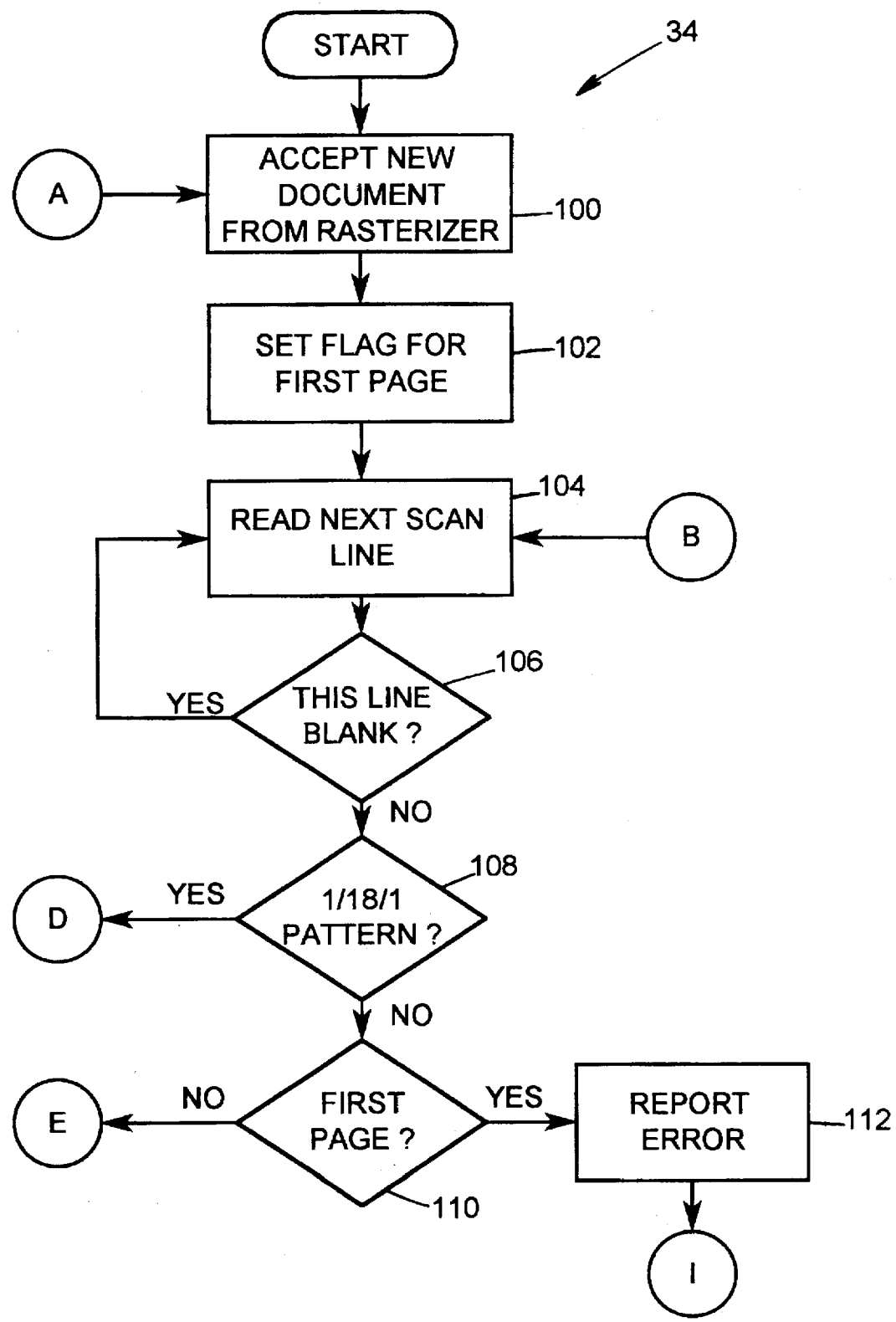
FIGS. 5–10 are a flowchart of a decoder used in the embodiments of the invention shown in FIGS. 1–3.

A flowchart of the decoder computer program or routine 34 shown schematically in FIG. 1 is illustrated in FIGS. 5–10. Referring to FIG. 5, at step 100, the rasterized document is received by the decoder routine 34 from the rasterizer 32. At step 102, a FIRSTPAGE variable or flag is set to binary "1" to indicate that the decoder routine 34 is has received a new document, and thus the first page of the document is to be scanned.

During the course of operation, the decoder routine 34 electronically "scans" each page of the entire document, from left to right, in a number of narrow, horizontal scan lines which span the entire horizontal width of the document. For example, for one line of human-readable text of normal-sized print, there may be 20 corresponding horizontal scan lines. As used herein, the term "scan," when used as a verb, means to inspect the electronic raster data associated with each scan line, and does not mean that the document is optically scanned. At step 104, a single scan line, which may be the first scan line the first time step 104 is performed or the next scan line during a subsequent performance of step 104, is "read" by reading and temporarily storing in memory the binary values of the raster data corresponding to that scan line. At step 106, if the scan line just read is blank (meaning the raster data for that scan line is all binary "0"s), the routine branches back to step 104 to read the next scan line. Thus, steps 104 and 106 are repeated until a non-blank scan line is detected.

When a non-blank scan line has been detected, the routine proceeds to step 108, where it determines whether the scan line contains the 1/18/1 pixel pattern (one blank or binary "0" pixel, followed by 18 black or binary "1" pixels, followed by one blank pixel) of the registration bars 42, 44 (FIG. 4A).

If the 1/18/1 pixel pattern was not detected at step 108, the routine branches to step 110 where it determines whether the first page of the document is being examined. If the first page of the document is being scanned (meaning that the first item on the first page of the document is not the facsimile keyword and facsimile number in the special font as expected), the routine branches to step 112 to generate an error message to that effect, and the routine branches to step 168 (FIG. 10) where it waits for the next document from the rasterizer 32 (the current document cannot be sent via facsimile since the facsimile number was not included on the first page). This format requirement could be modified or eliminated.

Figure 6:
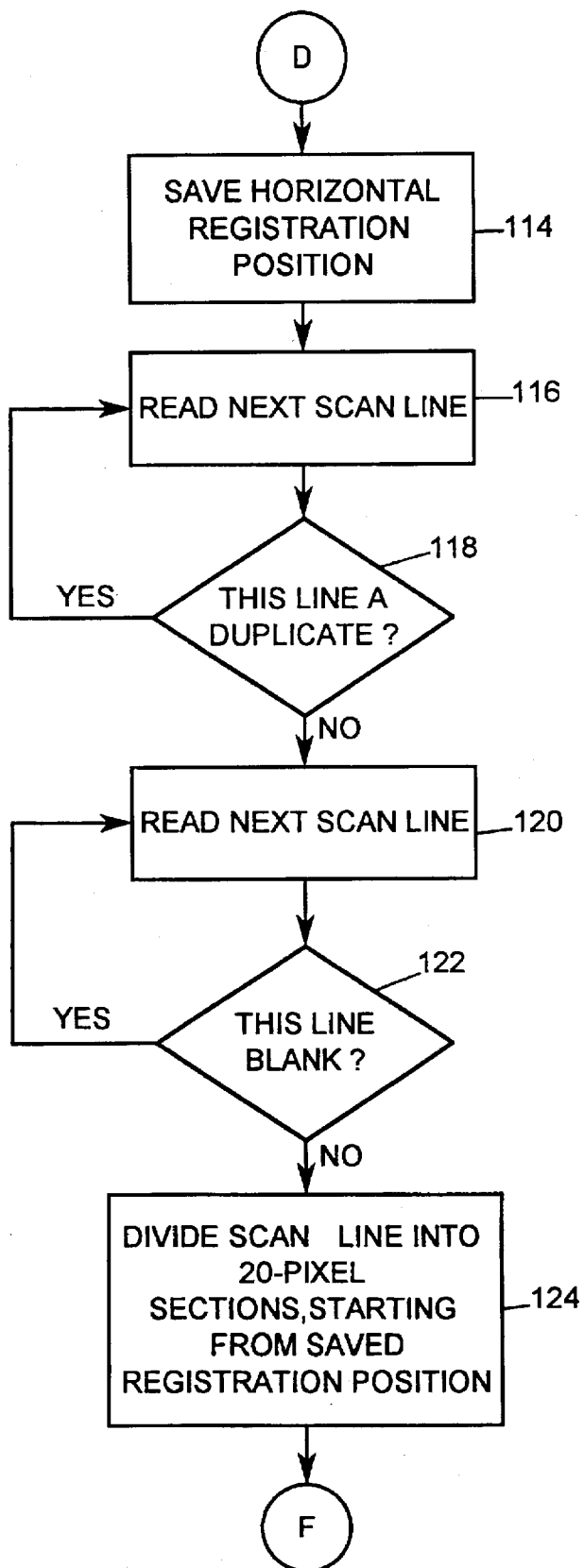

At step 108, if the 1/18/1 pixel pattern of the registration bars 42, 44 was detected, the routine branches to step 114 shown in FIG. 6, where the horizontal pixel position of the leftmost edge of the upper registration bar 42 is saved in memory. That registration position is subsequently used to accurately subdivide each scan line into 20-pixel segments, the width of which correspond to the width of each character of the special font shown in FIG. 4A.

At step 116, the next horizontal scan line is read and temporarily stored in memory as described above. At step 118, if the binary pixel values of this scan line are identical to those of the previous scan line, the routine branches back to step 116 where the next scan line is read and stored in memory. The fact that the two scan lines are identical means that the decoder routine is still detecting the upper row of registration bars 42. Steps 116 and 118 are repeated until the upper registration bars 42 are no longer detected.

At step 120, the next scan line is read and temporarily stored in memory. At step 122, if the scan line is blank (all the pixels in the scan line are binary "0"), the routine branches back to step 120 where the next scan line is read. Steps 120 and 122 are repeated until the first non-blank scan line following the upper registration bars 42 is detected, at which point the routine branches to step 124, where the current scan line, which is the scan line corresponding to the horizontal coded portions 46, is divided into 20-pixel segments, starting from the horizontal registration position determined at step 114.

Figure 7:
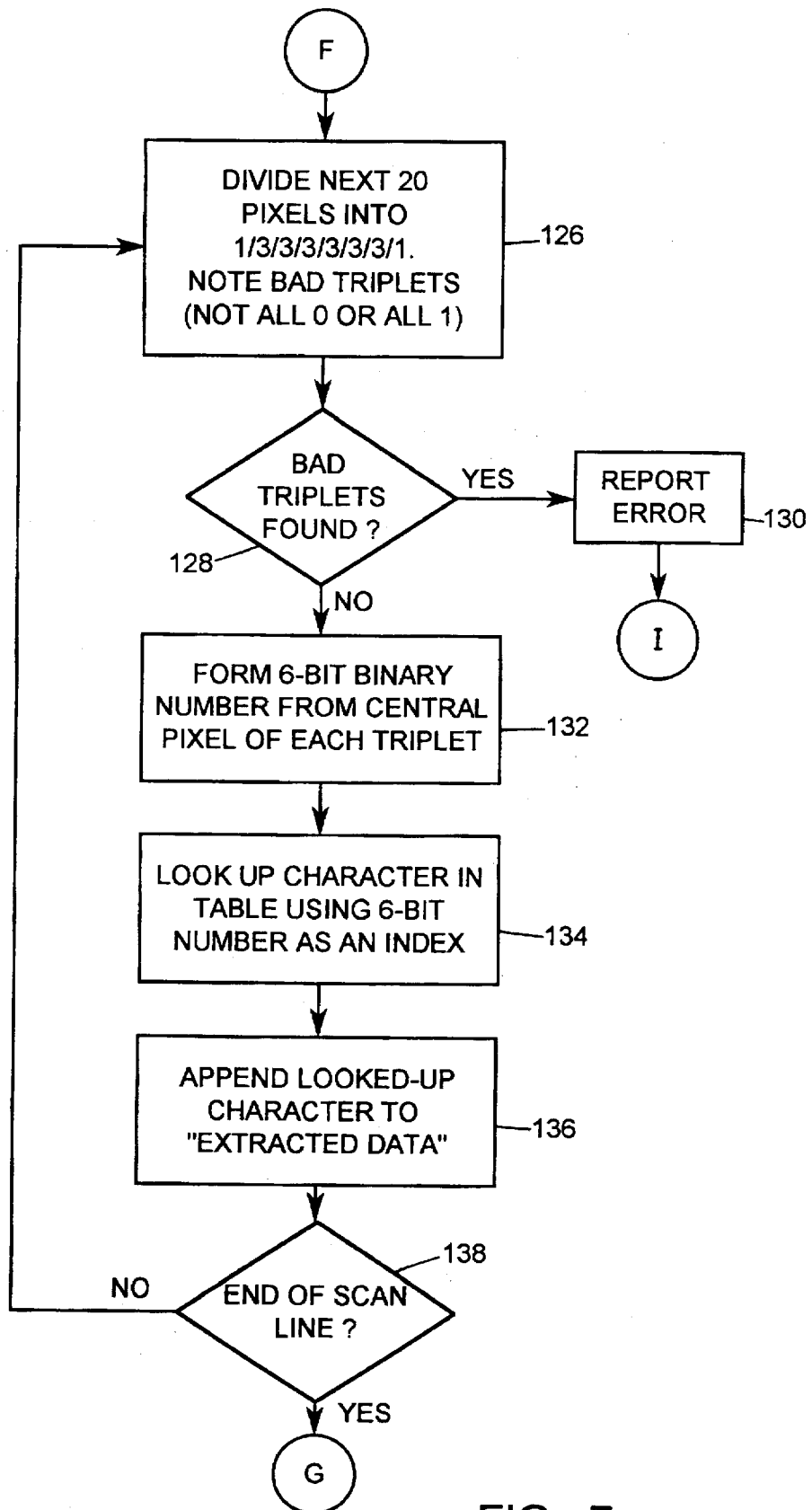

The routine then branches to step 126, shown in FIG. 7, during which the next (or first) twenty-pixel segment of the scan line is subdivided into a first one-pixel portion, six three-pixel portions (or triplets), and a final one-pixel portion, which is referred to herein as a 1/3/3/3/3/3/3/1 pixel format. It should be noted that this format is the same format used for each of the coded portions 46 (FIG. 4A). During step 126, the three pixels in each three-pixel segment or triplet are checked to see if they have the same value (all three pixels should have the same value since that is the coding scheme as described above).

At step 128, if the three pixels in any triplet did not have the same binary values, the routine branches to step 130 where the existence of such bad triplets is noted in an error message. In this case, the document is not sent via facsimile, and the routine then branches to step 168 of FIG. 10 to wait for the next document from the rasterizer 32.

If no bad triplets were found, the routine branches to step 132 where the central pixel in each of the six triplets read at step 126 is used to generate the six-bit binary code used to uniquely identify the character to which it corresponds. For example, assume that for one of the 20-pixel segments read at step 126, the decoder routine read the following sequence of binary values in which the central value in each triplet is underlined: 0,0$\underline{0}$0,1$\underline{1}$1,0$\underline{0}$0,0$\underline{0}$0,1$\underline{1}$1,0$\underline{0}$0,0. The six-bit code (determined from the underlined values) would thus be 010010.

At step 134, the character represented by the six-bit binary code generated at step 132 is identified by accessing the table set forth above (which is initially stored in the hard disk memory 18 and which is also stored in the RAM 14 for faster access times during operation of the decoder routine 34). The binary code 010010 set forth in the example above would represent the letter "B," as indicated in the above table.

At step 136, a coded representation of the character determined at step 134 is saved or appended (as "extracted data") to a character string consisting of the characters previously saved during a prior execution of step 136 (if any). The coded representation may be a binary representation, such as the ASCII code for the character, or some other coded representation, depending on the particular facsimile board 20 used.

At step 138, if the end of the scan line is not detected, the routine branches back to step 126, and steps 126–136 are repeated to decode the next 20-pixel segment. If the end of the scan line is detected at step 138, the routine branches to step 140 shown in FIG. 8. At step 140, the string of characters (or "extracted data") saved during the performance of step 136 is stored in memory.

At step 142, the next scan line is read, and at step 144, if the scan line just read does not match the 1/18/1 pixel pattern of the bottom registration bars 44, the routine branches back to step 142. Steps 142, 144 are repeated until the bottom registration bars 44 are detected. The result of steps 142 and 144 is to ignore the data representing the human-readable characters 40 provided between the coded portions 46 and the bottom registration bars 44 (see FIG. 4A). That data is not saved and thus is not transmitted via facsimile with the rest of the document.

When the bottom registration bars 44 are detected, the routine branches to step 146 where the next scan line is read. If this scan line is identical to the previous scan line, the routine branches back to step 146. Steps 146 and 148 are repeated until the bottom registration bars 44 are no longer detected. The routine then branches to step 150 of FIG. 9.

Figure 8:
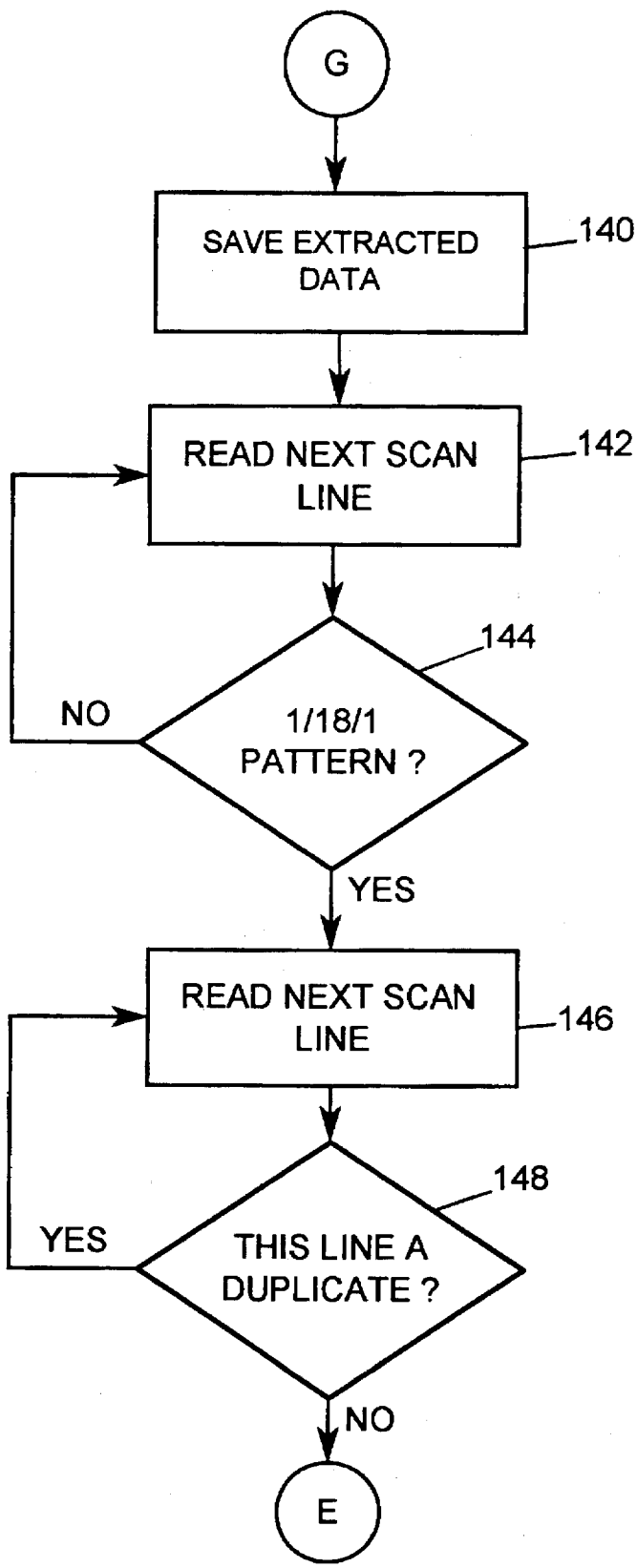
Figure 9:
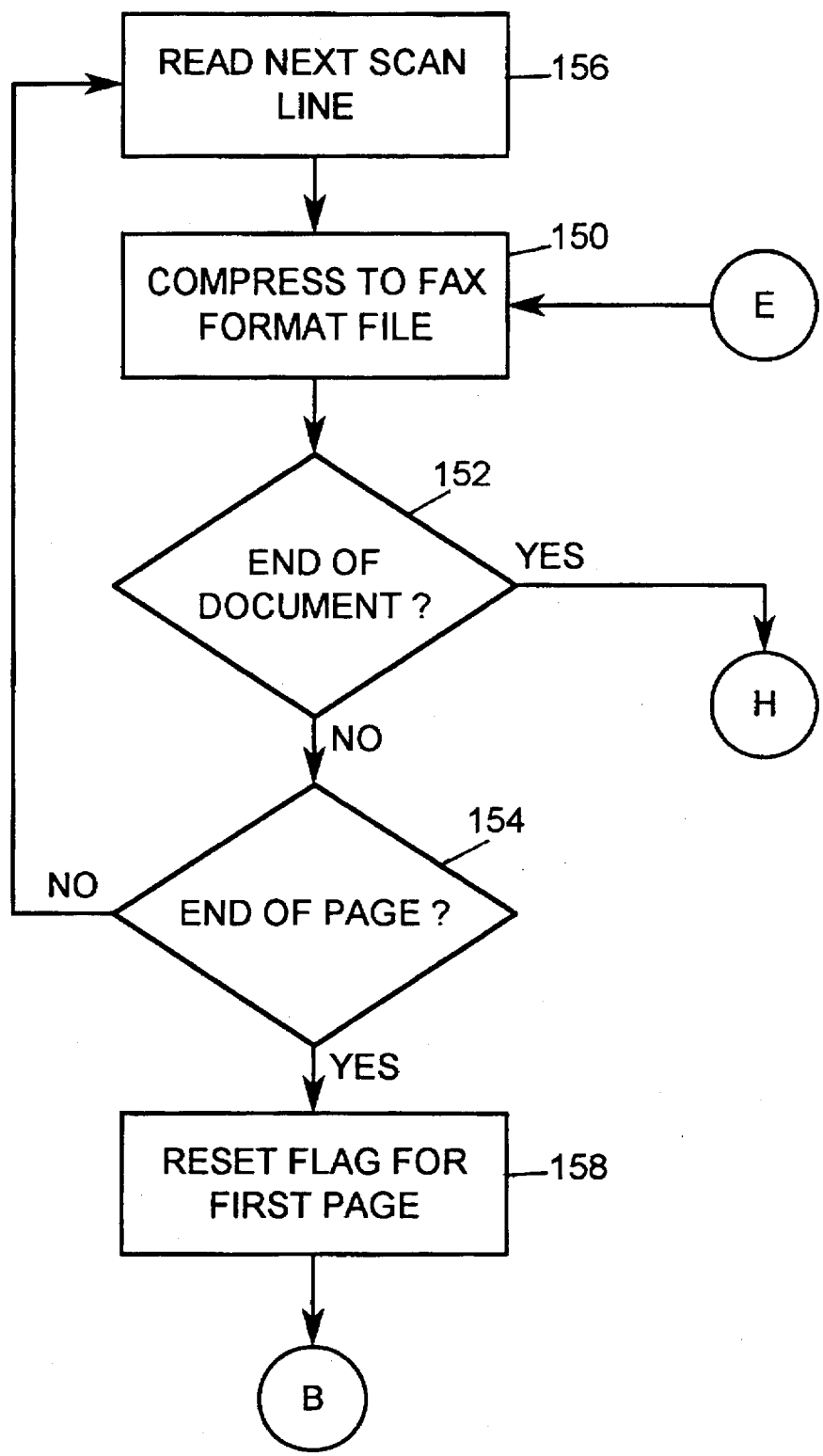

Referring to FIG. 9, at step 150, the raster data representing the scan line read during the last performance of step 146 (FIG. 8) is compressed and stored in a facsimile format file. The details of the data compression, which utilizes conventional run-length encoding with Huffman compression in conformance with CCITT standards, are not considered pertinent to the invention. At step 152, if the end of the document is not detected, the routine branches to step 154 where it determines whether the end of the page is detected. If the end of the page is not detected, the routine branches to step 156 where the next scan line is read. Steps 150–156 are repeated in order to compress and store in facsimile file format all raster data representing the image on that page of the document.

When the end of the page is reached, the routine branches to step 158, where the FIRSTPAGE flag (which was originally set at step 102 in FIG. 5) is reset to binary "0" to indicate that the decoder routine 34 is no longer reading the first page of the document to be sent via facsimile.

From step 158, the routine branches back to step 104 shown in FIG. 5. Since the second and subsequent pages of the document would not include any characters encoded in the special font, as shown in FIG. 4B, (since all such characters are by convention placed on the first line of the first page of the document) at this point the routine normally branches through steps 104–110 of FIG. 5 and to steps 150–156 of FIG. 9 where the raster data representing the next page of the document is compressed and stored for later transmission.

Figure 10:
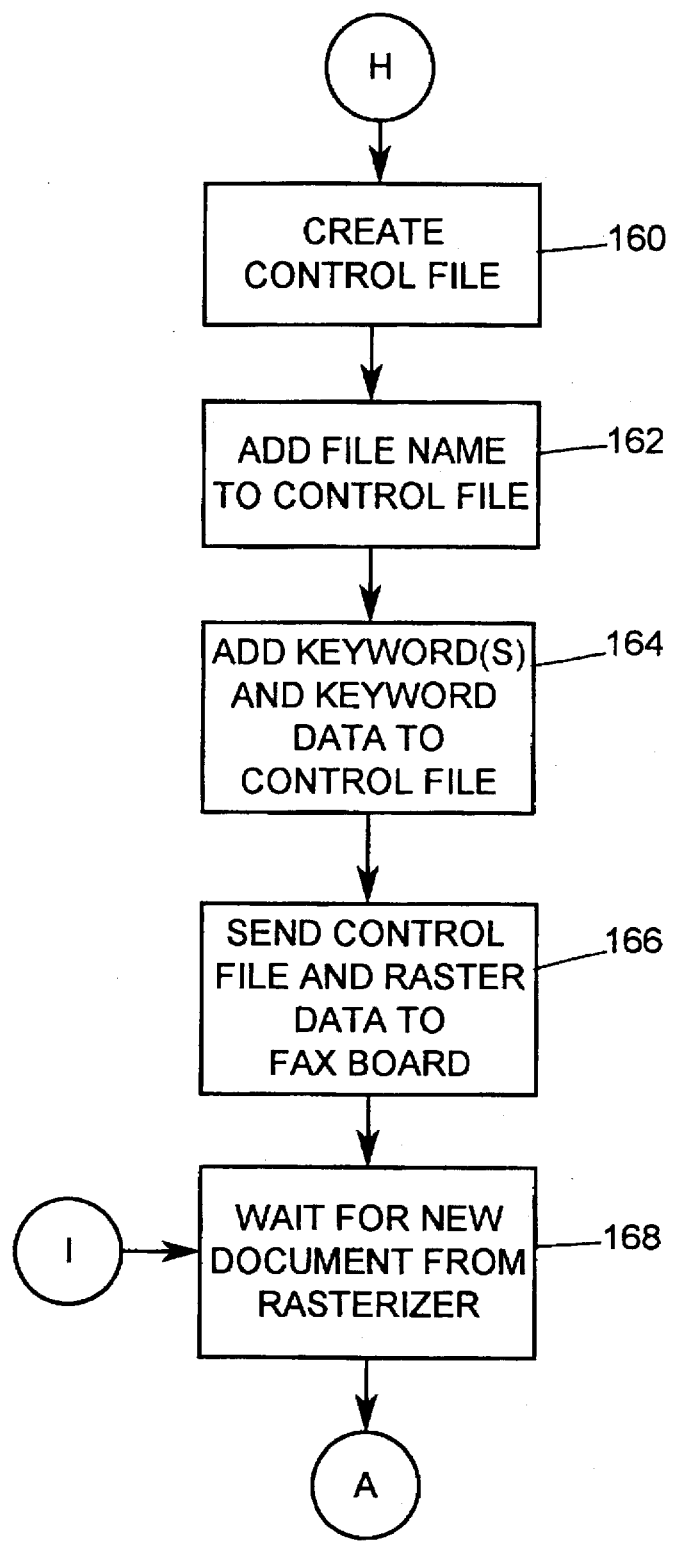

When the end of the document is reached, as determined at step 152 of FIG. 9, the routine branches to step 160 shown in FIG. 10. The purpose of steps 160–164 is to create a control file that will be used by the facsimile board 20 to send the document via facsimile. The particular format of the control file, which depends upon the particular facsimile board 20 used, is not pertinent to the invention. The control file contains a filename (to uniquely identify that control file) and all extracted data, which in this case includes the keyword "FAX=" and keyword data in the form of the facsimile number to which the document is to be sent, which was saved during step 140 (FIG. 8). At step 160, the control file is created, and at step 162 the filename of the control file is stored therein, along with the keyword(s) and keyword data stored in the control file at step 164. At step 166, the control file and all the raster data generated by compression during step 150 (FIG. 9) are transmitted to the facsimile board 20.

Upon receipt of the control file and the raster data, the facsimile board 20 transmits the raster data over the telephone line 26 (FIG. 1) using the facsimile number specified by the control file.

At step 168, the routine waits until the next document is rasterized by the rasterizer 32, at which time the routine branches to step 100 of FIG. 5, and the entire process described above is repeated for the next document.

The structure of the system 10 shown in FIG. 1 is exemplary only, and different structures could be utilized in accordance with the invention. For example, instead of utilizing the invention in connection with the system 10 having a facsimile board 20 disposed therein, the invention could be utilized in connection with one or more systems which do not incorporate facsimile boards, but which are instead connected to an external facsimile server. FIG. 2 illustrates such a system 200, which includes a plurality of computers 202, such as personal computers (PC) of a local area network, which are connected to a facsimile server 204 via a data link 206. The facsimile server 204 is connected to the telephone line 26. The structure of each computer 202 shown in FIG. 2 is identical to that of the system 10 of FIG. 1, except that the computers 202 do not incorporate facsimile boards 20.

The operation of the system 200 of FIG. 2 is substantially the same as described above in connection with the system 10 of FIG. 1, except that the control files and raster data are sent by the computers 202 to the facsimile server 204 instead of the facsimile board 20 of FIG. 1.

FIG. 3 illustrates another embodiment of the invention in the form of a system 300 having a computer 302 connected to a mass storage device 304 via a data communication link 306. The structure of the computer 302 is identical to that of the computers 202 shown in FIG. 2 and described in connection therewith. The mass storage device 304, which is a conventional, write-once, read-many times (WORM) data storage and retrieval system such as a CD-ROM recorder system, can store an extremely large number of documents which can be cross-referenced by one or more keywords. For example, where the storage and retrieval system 304 is used to store internal company memorandums, the rasterized version of each memorandum could be stored in the system 304 along with a number of keywords, such as "DATE=," "AUTHOR=," and "RECIPIENT=," and the associated keyword information identifying, respectively, the date of the memorandum, the author of the memorandum, and the recipient of the memorandum. The memorandums electronically stored in the mass storage device 304 could then be searched by any keyword or combination of keywords. For example, the mass storage device 304 could be searched to locate and retrieve copies of all memorandums authored by Johnson and dated after 1990. The particular manner in which the documents are retrieved from the storage device 304 is conventional and not considered part of the invention.

The use of the present invention in connection with the mass storage device 304 is advantageous in that keywords and keyword information could be automatically transmitted to the mass storage device. When the invention is used in this application, the operation is generally the same as described above in connection with the facsimile application, except that the documents are transmitted in raster form along with their respective control files (generated during steps 160–164 of FIG. 10) to the mass storage device 304 instead of to a facsimile board or a facsimile server. Also, instead of including the keyword "FAX=" and the facsimile number in the control files, multiple keywords and the associated keyword information (such as AUTHOR=Johnson, DATE=10 May 1993, etc.) would be included along with the raster data representing each document. The use of such keywords and keyword information in the special font of FIG. 4B would obviate the need to enter that information manually into the mass storage device 304.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An apparatus for sending a document from a first location via facsimile over a telephone line to a receiver facsimile machine at a second location remote from said first location, said apparatus comprising:
   means for generating decodable data representing a facsimile number identifying said receiver facsimile machine to which a document containing an image is to be sent over said telephone line via facsimile;
   decoding means for decoding said decodable data to determine said facsimile number prior to the establishment of a communication link with said telephone line; and
   facsimile means for sending raster data representing said image on said document over said telephone line to said receiver facsimile machine specified by said facsimile number.

2. An apparatus as defined in claim 1 wherein said decoding means comprises a permanent memory having coding data stored therein, said coding data including character data representing a plurality of numeric characters and a unique binary code associated with each of said numeric characters.

3. An apparatus as defined in claim 1 wherein said decodable data-generating means comprises a permanent memory having font data stored therein for representing each of a plurality of characters.

4. An apparatus as defined in claim 3 wherein said font data comprises, for each of said characters, a first data portion representing a human-readable representation of said character and a second data portion representing a decodable representation of said character.

5. An apparatus as defined in claim 4 wherein said decodable representation of said character comprises a 6-segment code representing said character.

6. An apparatus as defined in claim 4 wherein said font generation means additionally comprises means for causing, for each of said characters, said human-readable representation of said character to be disposed directly adjacent said decodable representation of said character when said character is placed in human-readable form.

7. An apparatus as defined in claim 1 wherein said decoding means comprises a permanent memory having coding data stored therein, said coding data including character data representing a plurality of characters and a unique binary code associated with each of said characters.

8. An apparatus comprising:
   means for generating decodable data representing a facsimile number specifying a location to which a document containing an image is to be sent via facsimile over a telephone line;
   rasterizing means for rasterizing said image of said document and said decodable data to generate raster data;
   decoding means for decoding said decodable data after said decodable data is rasterized by said rasterizing means to determine said facsimile number prior to the establishment of a communication link with said telephone line; and
   facsimile means for sending said raster data to said location specified by said facsimile number determined by said decoding means.

9. An apparatus as defined in claim 8 wherein said decoding means comprises a permanent memory having coding data stored therein, said coding data including character data representing a plurality of numeric characters and a unique binary code associated with each of said numeric characters.

10. An apparatus as defined in claim 8 wherein said decodable data-generating means comprises a permanent memory having font data stored therein for representing each of a plurality of characters.

11. An apparatus as defined in claim 10 wherein said font data comprises, for each of said characters, a first data portion representing a human-readable representation of said character and a second data portion representing a decodable representation of said character.

12. An apparatus as defined in claim 11 wherein said decodable representation of said character comprises a 6-segment code representing said character.

13. An apparatus as defined in claim 11 wherein said font generation means additionally comprises means for causing, for each of said characters, said human-readable representation of said character to be disposed directly adjacent said decodable representation of said character when said character is placed in human-readable form.

14. An apparatus as defined in claim 8 wherein said decoding means comprises a permanent memory having coding data stored therein, said coding data including character data representing a plurality of characters and a unique binary code associated with each of said characters.

15. An apparatus comprising: a mass storage device;
   means for generating decodable data representing a keyword and keyword data associated with a document with an image to be transmitted to said mass storage device;
   rasterizing means for rasterizing said document and said decodable data to generate raster data;
   decoding means for decoding said decodable data after said decodable data is rasterized by said rasterizing means to determine said keyword and said keyword data associated with said document prior to the establishment of a communication link with said mass storage device; and
   means for sending said raster data to said mass storage device.

16. An apparatus as defined in claim 15 wherein said decoding means comprises a permanent memory having coding data stored therein, said coding data including character data representing a plurality of characters and a unique binary code associated with each of said characters.

17. An apparatus as defined in claim 15 wherein said decodable data-generating means comprises a permanent memory having font data stored therein for representing each of a plurality of characters.

18. An apparatus as defined in claim 17 wherein said font data comprises, for each of said characters, a first data portion representing a human-readable representation of said character and a second data portion representing a decodable representation of said character.

19. An apparatus as defined in claim 18 wherein said font generation means additionally comprises means for causing, for each of said characters, said human-readable representation of said character to be disposed directly adjacent said decodable representation of said character when said character is placed in human-readable form.

20. An apparatus as defined in claim 15 wherein said decoding means comprises a permanent memory having coding data stored therein, said coding data including character data representing a plurality of characters and a unique binary code associated with each of said characters.

21. A method of sending a document from a first location via facsimile over a telephone line to a receiver facsimile machine at a second location remote from said first location, said method comprising the steps of:

(a) generating decodable data representing a facsimile number identifying said receiver facsimile machine to which a document containing an image is to be sent over said telephone line via facsimile;

(b) decoding said decodable data to determine said facsimile number prior to the establishment of a communication link with said telephone line; and (c) after said step (b), sending raster data representing said image on said document over said telephone line to said receiver facsimile machine specified by said facsimile number.

22. A method comprising the steps of:

(a) generating decodable data representing a facsimile number specifying a location to which a document containing an image is to be sent via facsimile over a telephone line;

(b) rasterizing said image of said document and said decodable data to generate raster data;

(c) decoding said decodable data after said decodable data is rasterized during said step (b) to determine said facsimile number prior to the establishment of a communication link with said telephone line; and (d) sending said raster data to said location specified by said facsimile number determined in said step (c).

23. A method comprising the steps of:

(a) generating decodable data representing a keyword and keyword data associated with a document with an image to be transmitted to a mass storage device;

(b) rasterizing said document and said decodable data to generate raster data;

(c) decoding said decodable after said decodable data is rasterized during said step (b) to determine said keyword and said keyword data associated with said document prior to the establishment of a communication link with said mass storage device; and (d) sending said raster data to said mass storage device.

* * * * *